United States Patent [19]

Kashio

[11] 4,085,312

[45] Apr. 18, 1978

[54] INPUT DATA-COLLATING DEVICE

[75] Inventor: Toshio Kashio, Tokyo, Japan

[73] Assignee: Casio Computer Co., Ltd., Tokyo, Japan

[21] Appl. No.: 692,438

[22] Filed: Jun. 3, 1976

[30] Foreign Application Priority Data

Jun. 4, 1975 Japan .................................. 50-66406

[51] Int. Cl.² ............................................. G06F 11/08
[52] U.S. Cl. .................................. 235/306; 235/312; G11C/29/00
[58] Field of Search ................ 235/153 AM, 153 AH, 235/306, 312; 340/174 ED, 173 R

[56] References Cited

U.S. PATENT DOCUMENTS

| | | | |
|---|---|---|---|
| 2,700,755 | 1/1955 | Burkhart | 235/153 AH |
| 2,832,412 | 4/1958 | Bellinger et al. | 235/153 AH |
| 3,612,843 | 10/1971 | Aptroot-Soloway | 235/153 AH |
| 3,794,818 | 2/1974 | Kennedy | 235/153 AM |
| 3,898,449 | 8/1975 | Sanabria | 235/153 AM |

*Primary Examiner*—Charles E. Atkinson

*Attorney, Agent, or Firm*—Flynn & Frishauf

[57] ABSTRACT

An input data-collating device comprising an electronic memory device, wherein the electronic memory device is stored with a series of record data supplied from an input key device, each of which is formed of a plurality of words. Collation is made after readout between at least a specified word selected from among a plurality of words included in the respective record data previously written in the electronic memory device and the corresponding specified word included in said plural record data subsequently written in the electronic memory device in order to ascertain whether said specified word has already been correctly written in the electronic memory device. A data certifying the correct entry of initial input is written in the electronic memory device after said correct entry has been provided by collation. When a series of record data finally read out from the electronic memory device is transmitted to the following data-processing device, the certifying data is used to determine whether the initial input data has been correctly written in the memory device.

4 Claims, 1 Drawing Figure

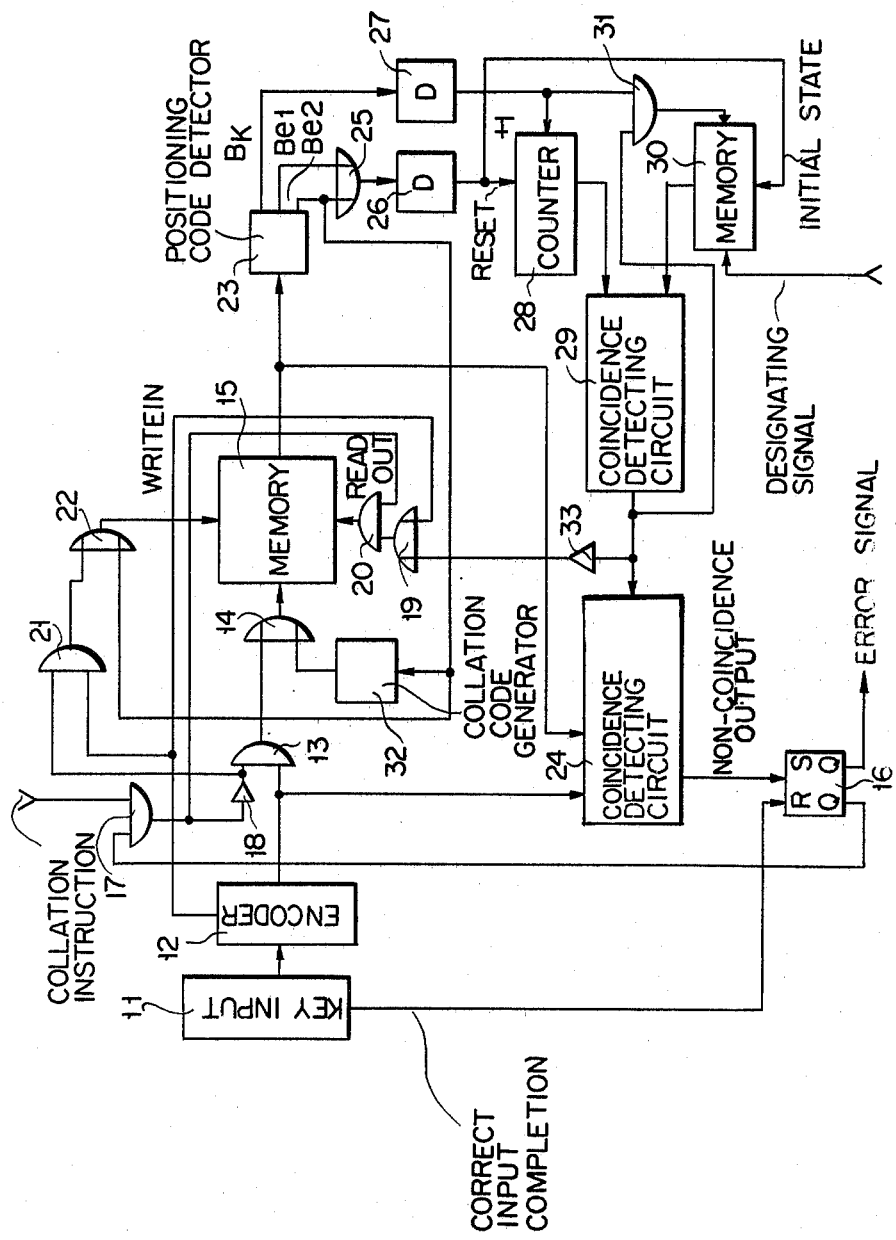

INPUT DATA-COLLATING DEVICE

This invention relates to an input data-collating device to ascertain whether input data has been correctly written in a memory device by operation of an input key device.

BACKGROUND OF THE INVENTION

If record data data should be written by an operator's wrong key operation in the electronic memory device, the subsequent processing of data read out from the memory device can not provide a correct result. Prior to the operation of a data-processing device, therefore, it is necessary to collate data previously written in an electronic memory device by key operation with data subsequently entered similarly by key operation in order to confirm whether initial input data was correctly written. Where, however, a large amount of input data is to be handled, it sometimes happens that input data supplied by way of collation does not exactly correspond to the data previously entered. Further, omission of checking tends to take place with a memory cassette or memory file in which unconfirmed data is stored. Therefore, record data whose collation was neglected leads to unreliable processing results when subsequently handled by a data-processing device. Moreover, it is accompanied with a complicated process to examine the correct entry of all data by the subsequent key operation for collation.

SUMMARY OF THE INVENTION

It is accordingly the object of this invention to provide an input data-collating device free from the above-mentioned drawbacks which comprises an electronic memory device for temporarily storing a series of record data supplied from an input key device to be later processed; a collation circuit for checking a coincidence between the previous record data read out from the electronic memory device upon receipt of a check-instructing signal and the collation record data subsequently supplied by key operation; and a circuit for storing the electronic memory device with data showing the correct or incorrect entry of input data immediately after collation has been finished.

This invention has the advantage that it is possible to confirm whether input data has been correctly written in an electronic memory device simply by collating a specified word selected from among a plurality of words included in the respective previously supplied record data with the corresponding specified word included said plural record data subsequently supplied by way of collation, thereby preventing the omission of checks. A further advantage is that when coincidence between both specified words is proved by collation, data showing the correct entry of initial input data is written in the electronic memory device behind a series of record data after completion of collation, thereby enabling said plural data to be reliably transmitted to the following data-processing device as correctly entered data.

BRIEF DESCRIPTION OF THE DRAWING

The appended drawing is a block circuit diagram of an input data-collating device embodying this invention.

DETAILED DESCRIPTION

There will now be described by reference to the appended drawing an input data-collating device embodying this invention. The drawing shows the arrangement of an input device. Referential numeral 11 denotes a manually operated input key device. Data supplied by the input key device 11 is coded by an encoder 12. Coded data delivered from the encoder 12 is supplied to an electronic memory device 15 consisting of, for example, an electronic memory, magnetic tape, drum and disk through an AND circuit 13 and OR circuit 14. The input key device 11 first writes, for example, bill data in an electronic memory device and, upon completion of the entry of said data, subsequently issues the corresponding data for collation again by manual key operation upon receipt of a collation-instructing signal. Further, the input key device 11 generates the later described signal showing the completion of the supply of a correction data by manual key operation. The correction input completion signal issued from the input key device 11 is conducted to the reset terminal of a flip-flop circuit 16. A reset output signal from the flip-flop circuit 16 is sent forth to an AND circuit 17 together with the collation-instructing signal.

An output signal from an inverter 18 connected to the output side of the AND circuit 17 controls the gate of the AND circuit 13. The encoder 12 generates a signal instructing the operation of the electronic memory device 15 upon the issue of a coded data. Said operation-instructing signal is transmitted through an OR circuit 19 to an AND circuit 20 which delivers a readout instruction to the electronic memory device 15 and also to an AND circuit 21 together with an output signal from the inverter 18. An output signal from the AND circuit 21 is supplied as a "writein"-instructing signal to the electronic memory device 15 through an OR circuit 22. An output signal from the AND circuit 17 is carried as a gate signal to the AND circuit 20.

Input data delivered from the input key device 11 is formed of a plurality of record data, for example, for each bill. The forward portion of a series of record data is indicated by a record positioning code "$Be_1$" and the rear portion thereof by a record positioning code "$Be_2$." Each record data is formed of a plurality of word data constituting the respective columns of a bill. Each word data is separated from others by a positioning code "$Bk$." A plurality of data stored in the electronic memory device 15 are read out in succession in response to a readout instruction delivered from the AND circuit 20. Data thus read out from the electronic memory device 15 is sent to a positioning code-detecting circuit 23 and a coincidence detection circuit 24. The coincidence-detecting circuit 24 is also supplied with collation input data delivered from the encoder 12 to collate said collation input data with the above-mentioned read-out initial input data. When noncoincidence occurs between the collation input data and read-out initial input data, then a noncoincidence output signal is issued to set the flip-flop circuit 16 which in turn sends forth an error signal with the resultant generation of a proper alarm.

When the record data-positioning codes "$Be_1$," "$Be_2$" and word-positioning code "$Bk$" are read out from the electronic memory device 15, the positioning code-detecting circuit 23 issues signals denoting the detection of these positioning codes. Signals showing the detection of the record data-positioning codes "$Be_1$," "$Be_2$"

are supplied to a delay circuit 26 through an OR circuit 25, and a signal indicating the detection of the word positioning code "B$k$" is conducted to a delay circuit 27. An output signal from the delay circuit 26 is transmitted as a reset instruction to a counter 28, which is designed to count a number of word-positioning codes "B$k$" upon receipt of an output signal from the delay circuit 27. A count signal issued from the counter 28 is carried to a coincidence detection circuit 29. This coincidence detection circuit 29 is also supplied with an output signal from a memory 30 which is stored with data denoting the sequential positions which a record data corresponding to the specified input data and consequently requiring checking occupy within a series of record data. This memory 30 is hereinafter referred to as "the specified record data position memory." Data stored in this "specified record data position memory" 30 is shifted upon receipt of an output signal from an AND circuit 31 connected to both delay circuit 27 and coincidence detection circuit 29. The specified record data position memory 30 is reset to the original condition upon receipt of an output signal from the delay circuit 26.

Information given on a bill, for example, a sales bill which includes items denoting, for example, "buyer," "name of commodity," "quantity," "amount" and "person in charge." Other items than the "quantity" and "amount" are represented by, for example, a respective number of codes. The possible wrong entry of the items designated by said number of codes can be unfailingly detected by any other checking means. But, the items of "quantity" and "amount" indicating optional numerical values which is not designated by, for example, binary codes should be particularly checked. The specified record data position memory 30 is formed of a shift register capable of storing a series of word data position in the sequential order to be checked whether input data has been correctly issued. Data stored in the specified record data position memory 30 is successively shifted upon receipt of a signal denoting the word positioning code "B$k$" from the delay circuit 27, each time the coincidence detection circuit 29 produces a coincidence output signal. When the delay circuit 26 produces a record data positioning code B$e_2$. The specified record data position memory 30 is brought back to the original condition upon receipt of said record data positioning code B$e_2$. When the counter 28 has made a count corresponding to the sequential position of a specified record data which has been issued from the specified record data position memory 30, then the coincidence detection circuit 29 produces a coincidence detection signal according to an AND product of outputs from both specified record data position memory 30 and counter 28. An output coincidence detection signal from the coincidence detection circuit 29 is supplied as a collation instruction to the other coincidence detection circuit 24 to collate the content of a specified word with that of the corresponding specified word subsequently supplied for collation. An inverter 33 is connected to the output terminal of the coincidence detection circuit 29. When not supplied with a coincidence detection signal, the inverter 33 sends forth to the OR circuit 19 a signal used as an instruction for readout the stored data from the electronic memory device 15. A signal denoting the detection of a record data positioning code B$e$ which has been issued from the positioning code-detecting circuit 23 is supplied as a gate input to the OR circuit 22, an output signal from which is delivered as a "writein" instruction to the electronic memory device 15.

Where the input data-collating device of the above-mentioned arrangement is supplied with fresh initial input data by manual operation of the input key device 11, a collation instruction is not yet generated, causing the gate of the AND circuit 13 to be opened by the inverter 18. Therefore, all fresh initial input data are written in the electronic memory device 15 which is already supplied with a "writein" instruction from the AND circuit 21.

Where it is desired to check whether, for example, a first operator supplied the electronic memory device 15 with initial input data by correct key operation, then another operator sends forth a collation instruction to the AND circuit 17 and delivers data corresponding to that supplied by the first operator to the encoder 12. Since, at this time, the flip-flop circuit 16 is in an initial reset state, the collation instruction is taken out through the AND circuit 17. The gate of the AND circuit 13 is closed, and a gate signal is supplied to the AND circuit 20. The coincidence detection circuit 29 which is still in an initial state does not produce a coincidence detection signal. Since the inverter 33 generates an output signal, when a collation instruction isses, readout instruction are delivered to the electronic memory device 15.

When stored data is read out from the electronic memory device 15, a foremost record data positioning code "B$e_1$" is first read out. The counter 28 is set at an initial reset state upon receipt of a detection signal from the positioning code detection circuit 23. Each time a word is read out from the electronic memory device 15, the corresponding word positioning code "B$k$" is read out. The counter 28 counts the sequential position of a read-out record data upon receipt of an output signal from the positioning code detection circuit 23. The coincidence circuit 29 judges whether a count value designated of the sequential position of the read-out record data indicated by an output count signal from the counter 28 is the same as that sequential word position of the specified record data which is already stored in the specified record data position memory 30. In other words, when the specified record data is going to be read out from the electronic memory device 15 to be processed by the following processing device, the coincidence detection circuit 29 produces a coincidence detection signal in case of a normal condition. When this coincidence detection signal is generated, the gate of the AND circuit 20 is closed, and readout from the electronic memory device 15 is stopped. At this time a collation instruction is sent forth to the coincidence detection circuit 24.

Under the above-mentioned condition where the coincidence circuit 29 issued a coincidence signal, another key operator again supplies a specified record data to confirm the correct entry of the data by collation by manual operation of the input key device. The gate of the AND circuit 20 is opened upon receipt of an advance signal which the encoder 12 issues, each time the aforesaid collation input is supplied. The record data previously stored in the electronic memory device 15 by the first key operator which corresponds to the record data subsequently written in said memory device 15 by the second key operator is read out to carry out collation between the contents of both record data in the coincidence detection circuit 24. Where the previously stored record data is free from errors, then a noncoincidence signal is not issued. When collation proves that the specified record data was correctly entered, then a count made by the counter 28 is advanced upon receipt of the word positioning code "B$k$" from the electronic memory device 15, causing the corresponding shift to be carried out in the specified record data position memory 30. If the coincidence detection circuit 29 does not produce a coincidence signal, that is, a discrepancy occurs between the sequential position of a record data previously stored in the electronic memory device 15 and that of the supposedly corresponding record data subsequently written therein, then previously stored record data are continuously read out from the electronic memory device 15 upon receipt of an output from the inverter 33. Thus, collation is made only between the specified record data previously written in the electronic memory device 15 and the corresponding record data subsequently supplied thereto. Where input data previously written in the electronic memory device is free from errors, then an output instruction is issued to a collation code-generating circuit 32 upon detection of the record data positioning code "B$e_2$" denoting the completion of checking. At this time, a "writein" instruction is given to the electronic memory device 15 through an OR circuit 22. Thus a collation code is written immediately behind the record data whose correct entry was proved. When the record data bearing said collation code read out from the electronic memory device 15, those data can be easily and correctly processed in the following data-processing device.

Where collation in the coincidence detection circuit 24 finds a difference between the previous data read out from the electronic memory device 15 and that of the subsequent input data again supplied for collation by operation of the input key device 11, then the coincidence detection circuit 24 issues a noncoincidence signal, which in turn sets the flip-flop circuit 16 with the resultant generation of an error signal. At this time, the gate of the AND gate 17 is closed to suspend the issue of a collation instruction and stop a collating operation. The gate of and AND circuit 13 is opened after detection of said noncoincidence and the prevention of the collation instruction, thereby allowing a correct record data to be written in the electronic memory device 15.

When the supply of correct record data from the input key device 11 is brought to an end, a signal denoting said completion is given forth to reset the flip-flop circuit 16, admitting of the "writein" of the succeeding fresh record data and the collation thereof.

In the foregoing embodiment, a record data positioning code "B$e_1$" was used to denote the forward portion of a record data whose collation was going to be carried out, and another record data positioning code "B$e_2$" was applied to indicate the completion of said collation. It is obviously possible to use any other common positioning code. Further, the specified record data position memory 30 was used to check only a particular word included in a specified record data by collation between said particular word and the corresponding word data again supplied for collation. It is also possible to check all the words included in a specified record data. Further, the specified record data position memory 30 may be omitted. Where, in this case, initial input data is supplied by operation of the input key device 11, a positioning code corresponding to a word requiring collation is temporarily converted into a special code. A signal denoting the detection of said special code is used in place of a coincidence detection signal delivered from the coincidence detection circuit 29. Where the aforesaid word requiring collation is found to have been correctly written in the electronic memory device 15, then the special code is changed back into, for example, the ordinary word positioning code, thereby indicating that collation has been finished. The word positioning code of the specified record data may be converted into another special code to be used in place of the specified record data position memory 30 in examining the correct entry of the word.

With the above-mentioned embodiment, a collation data was provided for each record data. However, it is possible to use a single collation data for a series of record data (such a number of record data capable of being written in a memory having a limited storing capacity). When these record data are written in the electronic memory device 15, it is advised to separate the respective record data from each other by a record data positioning code "B$e_1$" and write another record positioning code "B$e_2$" after the rearmost record data.

With the foregoing embodiment, the correct entry of initial input data in the electronic memory device 15 by a first key operator was confirmed by collating said initial input data with the corresponding input data subsequently written in the same electronic memory device 15 by a second key operator. However, it is possible to replace said electronic memory device by, for example, a movable hard-type memory device like a cassette type. In this case, the initial input data supplied by the first key operator is stored in said cassette type. The second key operator transfers the cassette type itself to a separately provided input data collating device to determine whether said initial input data was correctly entered in the electronic memory device by the previously described collating process. Or only the initial input data stored in the cassette type by the first key operator may be transmitted by some proper means, for example, electrically to a separately provided input data collating device to be examined by the second key operator through collation between said initial input data and the corresponding input data subsequently written by the second key operator in said separately provided input data-collating device.

What is claimed is:

1. A data-collating device for a bill data input apparatus having input key means for delivering a plurality of bill data and electronic memory means for receiving and serially storing the bill data from the input key means, said data-collating device comprising:

designation means for designating at least one specified part of each bill data stored in said memory means so as to deliver the same again from said input key means;

collation means coupled to said memory means for collating the specified part of each bill data delivered again from said input key means with the corresponding part of the bill data stored in said memory means;

input means coupled to said collation means and to said memory means for preventing the specified part of the bill data delivered again from said input key means from being stored into said memory means when said collation means detects coincidence and for permitting the specified part of the bill data delivered again from said input key means to be stored into said memory means in place of the corresponding part of the bill data stored in said memory means when said collation means detects noncoincidence;

detection means for detecting the completion of the collation of all the bill data; and means coupled to said detection means for writing into said memory means a signal indicating the completion of collation in response to a signal from said detection means.

2. A data-collating device for a bill data input apparatus having input key means for delivering a plurality of bill data and electronic memory means for receiving and serially storing the bill data from the input key means, said data-collating device comprising:

designation means for designating at least one specified part of each bill data stored in said memory means so as to deliver the same again from said input key means;

collation means coupled to said memory means for collating the specified part of each bill data delivered again from said input key means with the corresponding part of the bill data stored in said memory means; and means coupled to said collation means and to said memory means for writing codes into said memory means, each code indicating coincidence upon completion of the collation of each data unit which is comprised of a predetermined number of bill data.

3. A data-collating device for a bill data input apparatus having input key means for delivering a plurality of bill data and electronic memory means for receiving and serially storing the bill data from the input key means, said data-collating device comprising:

designation means for designating at least one specified part of each bill data stored in said memory means so as to deliver the same again from said input key means;

collation means coupled to said memory means for collating the specified part of each bill delivered again from said input key means with the corresponding part of the bill data stored in said memory means; and means coupled to said collation means and to said memory means for writing into said memory means a code indicating coincidence when said collation means detects the specified parts of every bill data delivered again to coincide with the corresponding part of the bill data stored in said memory means.

4. A data-collating device according to claim 3, further comprising means coupled to said collation means for indicating non-coincidence detected by said collation means.

* * * * *